United States Patent Office 3,119,807
Patented Jan. 28, 1964

3,119,807
DYESTUFFS CONTAINING TETRAMERIC CYANOGEN
Werner Bossard and Hans Ackermann, Riehen, near Basel, Herbert Seiler, Basel, and Jean Riethmann, Allschwil, near Basel, Switzerland, assignors to J. R. Geigy A.-G., Basel, Switzerland
No Drawing. Filed July 11, 1960, Ser. No. 41,776
Claims priority, application Switzerland July 10, 1959
6 Claims. (Cl. 260—153)

The invention concerns new dyestuffs which contain the radical of tetrameric cyanogen halide or a modification product of tetrameric cyanogen halide. The invention also concerns processes for the production of the new dyestuffs as well as their use for the dyeing of organic material of the most various kinds, in particular for the dyeing of textile fibres containing hydroxyl groups such as cellulose, and of polypeptide fibres, in particular wool, or of natural and synthetic fibers which are similar to wool as well as of leather, paper, plastic masses, synthetic resins and lacquers. The invention also concerns, as industrial product, the material dyed with the aid of the new dyestuffs.

It has been found that valuable dyestuffs are obtained if tetrameric cyanogen halide or a derivative thereof containing a mobile substituent removable as an anion, is reacted with an organic dyestuff having at least one replaceable hydrogen atom or with a dyestuff intermediate product which contains another substituent in addition to the replaceable hydrogen atom, which substituent does not change under the reaction conditions but which promotes the formation of the dyestuff, and, if the reaction products still contain mobile substituents, possibly reacting them with other organic compounds having hydrogen atoms which can be exchanged, and, if the reaction products contain radicals capable of forming the dyestuff, converting them by suitable reaction into dyestuffs.

A preferred embodiment of our invention consists in condensing tetrameric cyanogen chloride or a derivative thereof containing at least one mobile chlorine removable as the chloroanion, with an organic dyestuff containing an amino group capable of being acylated, the components preferably being so chosen that the final product contains anionogenic, salt-forming substituents conferring solubility in water. The dyestuffs so obtained correspond to the general formula

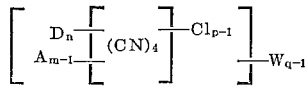

or to the formula

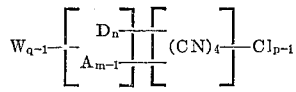

In this formula:

D represents the radical of anorganic amino dyestuff bound to a carbon atom of tetrameric cyanogen by amino-nitrogen,
A represents the radical of a nitrogenous base bound to a carbon atom of tetrameric cyanogen by amino-nitrogen,
W represents water-solubilizing anionogenic salt-forming groups attached to D and A, $m-1$ means the number of amino-nitrogen bound to carbon atoms of tetrameric cyanogen,
$m$ and $p$ each represent a positive whole number of at most 3,
$n$ represents a positive whole number of at most 2,
$q$ represents a positive whole number of at most 7,
The sum of $n$, $(m-1)$ and $(p-1)$ being 4.

More specifically in this formula:

D represents the radical of an organic amino dyestuff bound to a carbon atom of tetrameric cyanogen by amino-nitrogen, which dyestuff is selected from the group consisting of sulphonated aminomonoazo, sulphonated aminodisazo, sulphonated aminoanthraquinone and sulphonated aminophthalocyanine dyes; the radical of the dye is still more specifically and preferably selected from the groups consisting of metal-free and metaliferous sulphonated aminophenyl-azo-naphthalene, aminophenyl-azo-5-pyrazolone, aminonaphthyl-azo-naphthalene, aminophenyl-azo-pyrene, aminophenyl-azo-phenylene-azo-benzene, aminophenyl-azo - phenylene - azo - naphthalene, aminonaphthyl-azo-phenylene-azo-naphthalene dyes, of sulphonated 1 - amino - 4 - (aminophenylamino) - anthraquinone, sulphonated 1-amino-4-(aminodiphenylylamino)-anthraquinone, sulphonated copper phthalocyanine sulphonic acid aminophenylamide and sulphonated copper phthalocyanine sulphonic acid aminodiphenylylamide dyes.

A represents the radical of a nitrogenous base including ammonia, lower primary and secondary aliphatic amines and preferably primary and secondary phenylamines and sulphonated phenylamines. In the first step of condensing tetrameric cyanogen chloride, organic α.β-diamines are also suitable, 1,2-diaminobenzenes and 1,2-diaminobenzene sulphonic acids being then preferably used. A thus also represents the radical of organic α.β-diamines and, in this case, preferably o-diaminobenzene and sulphonated o-diaminobenzene radicals.

W more specifically represents a water-solubilizing anionogenic substituent selected from the group consisting of sulphonic acid and carboxylic acid groups.

$q$, in the preferred water soluble dyes suitable for dyeing textiles consisting of cellulose, or keratinous fibers and for dyeing leathers, means a positive whole number of 2 to 7 inclusive, and $p$, in the most valuable water soluble and reactive dyes of our invention means a positive whole number of at least 2 and $q$ means a positive whole number of 3 to 7 inclusive.

The reactive dyes of our invention defined above are suitable for the production of wet-fast dyeings on cellulose as is more specifically described below.

In the manufacture of our new dyes for textiles it is advantageous to use as starting material an organic dye which besides an amino group capable of being acylated, also contains acid salt-forming substituents conferring water solubility, preferably at least one sulphonic acid group. However, water soluble final products may also be obtained by condensing a water insoluble organic dye containing an amino group capable of being acylated in the presence of inert organic water soluble solvents with a water soluble derivative of tetrameric cyanogen chloride which contains mobile chlorine and radicals of organic amines substituted by acid salt-forming groups such as sulphonic acid or carboxylic acid groups, preferably sulphonated phenylamino radicals. If, on the other hand, the water insoluble starting amino dye is condensed with tetrameric cyanogen chloride or a derivative thereof containing mobile halogen and amine radicals devoid of acid salt-forming groups in an inert organic solvent such as lower ketones or dioxane in the presence of acid binding agents, pigment dyestuffs are obtained which are suitable for the colouring of lacquers, of solutions of acylated cellulose in organic solvents, of polymers, plastics, resins, paper pulp and paper.

Although it is possible to use practically each dyestuff containing an amino group capable of being acylated in our process of manufacture outlined above, it is advantageous to select the starting dyes from classes known to be stable towards light and other external influences, e. g., from the azo, anthraquinone and phthalocyanine dyes. They may be metal-free or may contain heavy metals in complex union, e. g., metals of the atomic numbers 24 to 29, especially copper, chromium and cobalt, possibly also nickel and iron. The starting dye may contain the heavy metal in the ratio of one basic dye molecule to one heavy metal atom as is usual with cupriferous dyes or in the ratio of two basic dye molecules to one heavy metal atom if the latter is co-ordinatively hexavalent as is the case with chromium and cobalt; the two basic dye molecules co-ordinated with one heavy metal atom may be the same or different. Metalliferous dyes of the phthalocyanine, o,o'-hydroxy and o-hydroxy-o'-amino-diarylazo series for example are used.

Suitable starting aminoazo dyes which correspond to D in the above formula are, for example, p-aminoaryl-monoazo dyes, preferably 4 - (sulphonaphthylazo) - 1-aminobenzene dyes, p-aminoaryl-disazo dyes, m- and p-amino-o-sulphophenyl-azo-5-pyrazolone dyes, o-phenylazo-hydroxynaphthalene dyes, preferably 2-(o-sulphophenylazo)-1-hydroxy-3- or -4-sulphonaphthalene dyes containing an amino group or an aminobenzoylamino group capable of being acylated and, possibly, additional sulphonic acid groups, sulphonated cupriferous, chromiferous and cobaltiferous o,o'-dihydroxy-, o-carboxy-o'-hydroxy- and o-hydroxy-o'-aminoazo dyes, preferably of the benzene-azo-naphthalene and of the naphthalene-azo-naphthalene series containing an amino group capable of being acylated; sulphonated chromiferous and cobaltiferous o,o'-dihydroxy-disazo dyes preferably of the 2,6-bis-arylazo-1-hydroxybenzene series containing an amino group capable of being acylated, the arylazo groups being the same or different groups of the benzene and naphthalene series; sulphonated chromiferous and cobaltiferous 4-(o-carboxyphenylazo)-5-pyrazolone and 4-(o-hydroxyarylazo)-5-pyrazolone dyes containing an amino group capable of being acylated and analogous dyes containing enolic coupling components such as, e. g., acylacetylarylamides, 2,4-dihydroxyquinolines and barbituric acid.

In suitable dyestuffs, the heavy metal can also be introduced only after the reaction with tetrameric cyanogen chloride or with a reactive derivative thereof. Also o-aminoazo dyestuffs can be used as starting materials, for example, the dyestuffs from o-sulphodiazobenzene and o-sulphodiazodiphenyl compounds and aminonaphthalene compounds coupling in the o-position to an amino group provided that they contain amino groups which can still be acylated in the diazo or coupling components. All these starting materials can contain the other substituents usual in azo dyestuffs, for example, halogen, lower alkyl, lower alkoxy, phenoxy, nitro, acylamino, carboxyl, sulphonic acid, carbamyl, sulphamyl, alkylsulphonyl, arylsulphonyl, 1,2-sulphomethyleneoxy, 1,2-dioxino groups.

Azo dyestuffs according to the invention can also be produced, however, by using diazo and coupling components which already contain the radical of tetrameric cyanogen chloride or of derivatives thereof. Examples of such diazo components are the reaction products of 5,2- or 4,2-diaminobenzene-1-sulphonic acids, of 4,4-diaminodiphenyl-3-sulphonic acids as well as of their aminobenzoyl or aminophenyl carbamyl derivatives. Examples of such coupling components are the reaction products which can be coupled of hydroxyaminonaphthalenes and of their aminobenzoyl and aminophenyl carbamyl derivatives, in particular the reaction products of 5-, 6-, 7- or 8-amino-1-hydroxynaphthalene - 3 - sulphonic acids and derivatives thereof. Naturally, these components can also contain other substituents usual in azo dyestuffs, for example those listed in the previous paragraph.

Valuable dyestuffs according to the invention are also obtained on reacting tetrameric cyanogen chloride or a reactive derivative thereof with anthraquinone dyestuffs which have at least one acylatable amino group. Principally sulphonated anthraquinone dyestuffs are used which contain the acylatable amino group in an external position at a substituent of the anthraquinone ring, e. g., in an arylamino or aryloxy group, particularly in a phenylamino group. There can be one or more of such aminophenylamino groups, advantageously in α-position or in 1,4-position, possibly also in the 1,5-position of the anthraquinone radical. In addition to the amino substituents which are advantageously in the 1,3- or 1,4-position, the phenyl radical can also be substituted in other ways, for example, by lower alkyl, lower alkoxy or by phenoxy or phenylthio-ether groups, all of which are advantageously in the 2,6-position with regard to the anthraquinone linkage. In this case too, valuable dyestuffs can be formed by using components which already contain the radical of tetrameric cyanogen chloride or of derivatives thereof, for example by reacting anthraquinone compounds having mobile substituents, in particular bromine in the α-position, with such amino compounds which can be condensed which already contain the radical of tetrameric cyanogen chloride or of one of its derivatives. Examples of such components are the 2-amino-substituted 5- or 4-aminobenzene-1-sulphonic acids or the 4'-amino-substituted 4-aminodiphenyl-3'-sulphonic acids obtained by acid saponification from the corresponding acetylamino compounds. These sulphonic acids are reacted, for example, with 1-amino-4-bromoanthraquinone-2-sulphonic acids which, in the 5-, 6- or 7-position of the anthraquinone ring, can also be substituted by a further sulphonic acid group, by 1 to 2 halogen atoms such as fluorine, chlorine or bromine, or by an alkyl sulphonyl group.

Phthalocyanine dyestuffs according to the invention are derived from metal-free or metal-containing phthalocyanines, advantageously from phthalocyanines containing copper but also from those containing cobalt, nickel and tin. The benzo radicals of the phthalocyanine structure can be substituted, for example, by halogen, phenyl, sulphonic acid, carboxyl, sulphamyl, carbamyl groups. The amino groups reacted according to the invention therein are either bound direct to a benzo radical of the phthalocyanine structure or, advantageously, they are bound to the benzo radicals by means of a divalent bridging member. Phenylene, —CO-phenylene, —SO$_2$-phenylene, —NH-phenylene,

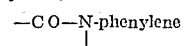

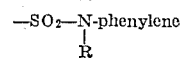

(R=H or alkyl), —O-phenylene, —S-phenylene, —CH$_2$-phenylene, —SO$_2$-O-phenylene groups and also alkylene and

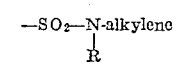

groups are examples of such divalent bridging members. The dyestuffs according to the invention are also obtained by partial or complete reaction of the known phthalocyanine and metal phthanocyanine polysulphonic acid chlorides with organic diamines having two different, easily acylatable amino groups, for example with 2,4- or 2,5-diaminobenzene-1-sulphonic acids or with 4,4'-diaminodiphenyl-3-sulphonic acids, and then reacting the condensation products with tetrameric cyanogen chloride or with a reactive derivative thereof. Also, the phthalocyanine polysulphonic acid halides can be completely or partially reacted with monoacylated aliphatic amines, e. g., with monoacetylethylenediamine and, after saponification of the acylamino groups, the reaction product can be reacted with tetrameric cyanogen chloride or with a reactive derivative thereof. Advantageously, the reaction conditions and components are so chosen that several sulphonic acid groups are present in the end product.

The tetrameric cyanogen chloride used according to the invention is formed in the catalyzed polymerization of cyanogen chloride in organic solvents, for example in aliphatic ethers. It is a water-clear liquid which can be distilled at 126° C. under 14 mm. Hg without decomposition. Its density is $d_{29}^4$ 1.681, its refractive index is $n_{20}$ 1.5759, its molecular weight is 246 (found 239 by the ebullioscopic method in benzene) and its composition is $C_4N_4Cl_4$, for which elementary analysis gave the following results:

|  | C | H | N | Cl | O |  |
|---|---|---|---|---|---|---|
| found | 19.73 | 0.0 | 23.06 | 57.78 | 0.0 | % |
| calculated | 19.54 | 0.0 | 22.79 | 57.67 | 0.0 | % |

Tetrameric cyanogen chloride probably corresponds to the formula

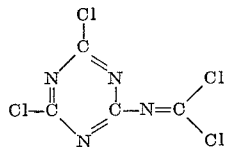

It contains 4 mobile chlorine atoms of which two are replaced even in the cold, the third is gradually replaced at 15–16° and the fourth gradually replaced at 7–100° C. by nucleophilic radicals, for example by ether, thioether, amino or aromatic hydrocarbon groups. It is also possible to use bromine-containing tetramine cyanogen halide which is formed by polymerising cyanogen chloride with hydrogen bromide in organic solvents, in particular in dialkyl ethers. It is often advantageous not to react tetrameric cyanogen chloride direct with the dyestuffs but first to reduce the high reactivity by the introduction of 1 to 3 organic radicals, in particular amino radicals but possibly also ether groups may be introduced. The reactive derivatives of tetrameric cyanogen chloride used according to the invention contain, advantageously, 1 to 3 mobile chlorine atoms and 3 to 1 amine radicals, in particular either aliphatic amine radicals or, advantageously, sulphonated or unsulphonated phenylamino groups, or both at the same time.

The reaction with the dyestuffs or dyestuff intermediates containing acylatable amino groups is performed advantageously in aqueous or organic/aqueous solution of at least one of the components with the careful use of mineral acid buffering agents such as mixtures of buffer salts which consist, for example of alkali metal-o-phosphates, alkali metal salts of low fatty acids, alkali bicarbonates. Advantageously the pH of the reaction medium is never allowed to considerably exceed 6.5.

Only one or also several identical or different dyestuffs can be bound to one molecule of tetrameric cyanogen chloride or of a derivative thereof having several mobile chlorine atoms. As has already been stressed, those dyestuffs according to the invention are particularly valuable which also contain reactive substitutents, in particular mobile chlorine atoms. This is also the case with the new dyestuffs containing more than only one basic dyestuff.

These particularly valuable dyestuffs are suitable, in particular, for obtaining wet fast dyeings provided that the substratum has reactive groups, for example, hydroxyl or amino groups.

To attain wet fast cellulose dyeings, the textile goods are impregnated, for example, with stock solutions of the dyestuffs according to the invention, which solutions can contain the additives usual in dyeing, in particular greater contents of neutral salts such as sodium chloride or sulphate and dispersing, wetting and levelling agents such as, e. g., polyglycol ethers of higher aliphatic alcohols, or of higher aliphatic mono- or poly-amines as well as water soluble acid amides such as urea, formamide, lactams of low fatty acids. The goods are then squeezed out, dried and fixed at a medium or greater heat, advantageously in the presence of acid binding agents. For textile printing the usual solutions thickened with higher molecular carbohydrates and derivatives thereof are used. The prints are fixed similarly to the dyeings and impregnations. After soaping the fixed dyeings and prints, the dyed material has excellent wet fastness.

Provided their composition is suitable, the textile dyestuffs according to the invention draw onto wool often from even a neutral to weakly acid bath, even if the dyestuff contains no mobile substituents. They produce dyeings of remarkable wet fastness properties. However, particularly good wet fastness properties are also obtained on treating in the warm or on treating with acid binding agents when the dyestuff, before use, already contnained mobile substituents.

Similar good results are obtained on dyeing leather, for which purpose advantageously products having more than one colour component in the molecule are used.

A further application of the invention consists also in first treating a substratum containing reactive groups which has to be coloured with a derivative of tetrameric cyanogen chloride containing more than one reactive substituent and then reacting with a dyestuff containing acylatable amino groups. For example, cellulose previously treated with alkali liquors can be reacted with the reaction product of tetrameric cyanogen chloride having 1 to 2 mols of amine (of which one is advantageously a sulphonated amine of the benzene or naphthalene series) and then treating with an organic dyestuff containing an acylatable amino group, this treatment being performed in the presence of acid binding agents and while heating. After soaping, material which is also dyed wet fast is obtained in this way. Also a reaction product of tetrameric cyanogen chloride which contains reactive substituents can be used, which reaction product contains either radicals having aromatically bound diazotisable amino groups or radicals with a carbon atom which can be coupled by aromatic diazonium compounds, and then an azo dyestuff can be brought onto the fibre in the usual way.

The substrata to be coloured which have been previously treated with a derivative of tetrameric cyanogen chloride are regarded as coming within the scope of the patent claim provided that they contain either reactive groups or radicals suitable for the formation of the dyestuff.

Also the substrata to be coloured which contain reactive groups can be pad dyed with dispersions of the dyestuffs according to the invention which are difficultly soluble. The dyeings can be fixed in the warm in the presence of lubricants such as urea. For example, also cellulose can be pad dyed with a substantive azo component and treated with an aryldiazonium compound containing a radical derived from tetrameric cyanogen chloride which radical contains reactive substituents, and the dyeing can be fixed in the usual way by heating and/or with the aid of acid binding agents.

Fast dyeings in yellow, orange, red, brown, violet, blue, green and black can be obtained with the dyestuffs according to the invention. Cellulose dyeings have particularly valuable fastness properties if, after fixing, they are given a soap washing to remove unfixed dyestuff.

The following examples illustrate some methods of applying the invention. Where not otherwise stated, parts are given therein as parts by weight. The temperatures are in degrees Centigrade. The relationship of parts by weight to parts by volume is as that of grammes to millilitres.

*Example 1*

18.6 parts of 1-aminobenzene (A, B) are dissolved in 250 parts of water and 200 parts of acetone. 25.8 parts of tetrameric cyanogen chloride dissolved in 50 parts of acetone and in aqueous sodium carbonate solution are then added dropwise simultaneously at 0° so that the pH of the reaction mixture is 5–6. As soon as no more free amino groups can be traced, the temperature is raised to 30–40° and the pH of the mixture is brought to 6–6.5.

42.1 parts of the sodium salt of the aminomonoazo dyestuff (C) from diazotized 1-aminonaphthalene-3,6-disulphonic acid coupled with 1-amino-3-methylbenzene, are dissolved in 500 parts of water. This solution is slowly added dropwise at 30–40° while stirring well to the above reaction mixture, care being taken by the simultaneous addition of sodium carbonate solution that the pH always remains between 6–6.5. On completion of the reaction, the new dyestuff of the formula

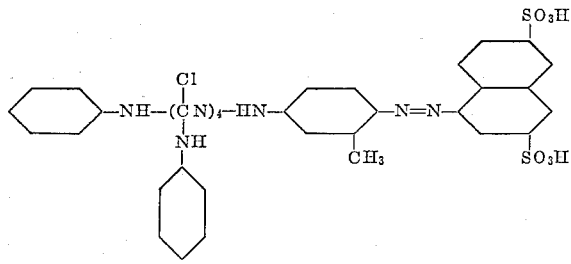

is precipitated by the addition of sodium chloride, filtered off and dried. It is a yellow powder which dissolves in water with a yellow colour.

2 parts of the dyestuff are dissolved in 400 parts of water. 100 parts of cotton are entered at 40–45°, the bath is heated within 30 minutes to 80° while simultaneously adding 50 g. of sodium chloride in portions per litre. At the end of this time, 20 parts of trisodium phosphate per litre are added and dyeing is performed at this temperature for another 60 minutes. The goods are then rinsed and soaped at the boil for 30 minutes, the soap solution only being slightly coloured. A very level, yellow dyeing is obtained which is fast to light, washing and boiling.

The dyestuff described above corresponds to the schematic formula

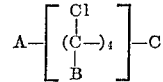

wherein A, B and C, in the order of reaction, represent the radicals of the amino compounds mentioned in the text which are reacted gradually.

If, instead of 1-aminobenzene and instead of the amino azo dyestuff 1-aminonaphthalene-3,6-disulfonic acid→1-amino-3-methylbenzene, the components given under A, B and C in the following table are used and otherwise the same procedure is followed as described in this example, then dyestuffs are obtained which produce cellulose dyeings having similarly good fastness properties.

| No. | A–B | C | Metal | Shade |
|---|---|---|---|---|
| 1 | 1-aminobenzene | 2-aminonaphthalene-5,7-disulphonic acid→1-amino-3-methoxybenzene | | Yellow. |
| 2 | ___do___ | mixture of 3-aminopyrene-5,8-disulphonic acid and 3-aminopyrene-5,10-disulphonic acid→1-amino-3-methylbenzene. | | Yellow-orange. |
| 3 | 1-amino-2-chlorobenzene | 2-aminonphthalene-4,8-disulphonic acid→1-amino-3-methylbenzene | | Yellow. |
| 4 | ___do___ | 1-amino-3-acetylaminobenzene-6-sulphonic acid→1-amino-8-hydroxynaphthalene-3,6-disulphonic acid. | | Red. |
| 5 | ___do___ | 1-aminobenzene-2,5-disulphonic acid→1-(3'-aminobenzoylamino)-8-hydroxynaphthalene-3,6-disulphonic acid. | | Do. |
| 6 | 1-amino-4-methylbenzene | 1-amino-2-hydroxybenzene-5-methyl sulphone→1-amino-8-hydroxynaphtalene-3,6-disulphonic acid. | Cr | Black. |
| 7 | Aminobenzene-2-sulphonic acid | 2-aminonaphthalene-4,8-disulphonic acid→1-amino-2-methoxy-5-methylbenzene. | | Yellow. |
| 8 | 1-aminobenzene-2-sulphonic acid | 2-aminonaphthalene-6,8-disulphonic acid→1-amino-2-methoxy-5-methylbenzene. | | Do. |
| 9 | 1-amino-2-chlorobenzene | 1-aminobenzene-2-sulphonic acid→1-amino-8-hydroxynaphthalene-3,6-disulphonic acid. | | Red. |
| 10 | 1-aminobenzene | 1-aminobenzene-2-sulphonic acid→1-(3'-aminobenzoylamino)-8-hydroxynaphthalene-3,6-disulphonic acid. | | Do. |
| 11 | 1-aminobenzene-2-sulphonic acid | 1-aminobenzene-2-sulphonic acid→2-(3'-aminobenzoylamino)-5-hydroxynaphthalene-7-sulphonic acid. | | Orange. |
| 12 | ___do___ | 2-aminonaphthalene-4,8-disulphonic acid→1-N-ethylamino-3-methylbenzene. | | Yellow. |
| 13 | ___do___ | 2-aminonaphthalene-4,8-disulphonic acid→1-amino-3-acetylaminobenzene. | | Do. |
| 14 | ___do___ | 2-aminonaphthalene-4,8-disulphonic acid→1-amino-2-methoxy-5-methylbenzene→1-amino-3-methylbenzene. | | Yellow-brown. |
| 15 | ___do___ | 4-aminoazobenzene-3,4'-disulphonic acid→1-amino-3-acetylaminobenzene. | | Orange-brown. |
| 16 | ___do___ | 6-methyl-2-(3'-sulpho-4'-aminophenyl)-benzthiazole-7-sulphonic acid→1-aminobenzene. | | Yellow. |
| 17 | ___do___ | 1-amino-3-benzoylaminobenzene-6-sulphonic acid→1-amino-8-hydroxynaphthalene-3,6-disulphonic acid. | | Red. |
| 18 | ___do___ | 1-amino-4-acetylaminobenzene-6-sulphonic acid→2-amino-5-hydroxynaphthalene-7-sulphonic acid. | | Scarlet. |
| 19 | 4-aminobenzene-1-sulphonic acid | 4-methyl-1-aminobenzene-6-sulphonic acid→2-(3'-aminobenzoylamino)-5-hydroxynaphthalene-7-sulphonic acid. | | Orange. |
| 20 | 1-aminobenzene-2-sulphonic acid | 1-aminobenzene-2-sulphonic acid→1-(4'-aminophenyl)-3-methyl-5-pyrazolone. | | Yellow. |
| 21 | 2-aminobenzene-1-sulphonic acid | 4-nitro-1-aminobenzene-2-sulphonic aicd→2-aminonaphthalene-7-sulphonic acid, reduced. | | Orange. |
| 22 | 1-aminobenzene-3-sulphonic acid | 1-aminobenzene-2,5-disulphonic acid→1-(3'-aminophenyl)-3-methyl-5-pyrazolone. | | Yellow. |
| 23 | 1-aminobenzene-2-sulphonic acid | 1-amino-2-hydroxybenzene-5-sulphonic acid→2-amino-5-hydroxynaphthalene-7-sulphonic acid. | Cu | Ruby. |
| 24 | 1-aminobenzene | 1-amino-2-hydroxybenzene-5-sulphonic acid→1-amino-8-hydroxynaphthalene-3,6-disulphonic acid. | Cu | Violet. |
| 25 | 4-nitro-1-aminobenzene-2-sulphonic acid | 1-amino-8-hydroxynaphthalene-4-sulphonic acid←2,6-diamino-1-hydroxybenzene-4-sulphonic acid→1,3-dihydroxybenzene. | Cu | Black. |
| 26 | 1-aminobenzene | 1-amino-8-hydroxynaphthalene-3,6-disulphonic acid←2,6-diamino-1-hydroxybenzene-4-sulphonic acid→2-hydroxynaphthalene. | Co | Do. |
| 27 | ___do___ | 1-amino-8-hydroxynaphthalene-4-sulphonic acid←2,6-diamino-1-hydroxybenzene-4-sulphonic acid→3-methyl-5-pyrazolone. | Co | Do. |
| 28 | 1-aminobenzene-2-sulphonic acid | 1-amino-2-hydroxybenzene-4-sulphonic acid→1-(3'-aminobenzoylamino)-8-hydroxynaphthalene-3,6-disulphonic acid. | Cu | Violet. |
| 29 | 1-aminobenzene | 6-nitro-1-diazo-2-hydroxynaphthalene-4-sulphonic acid→1-(3'-aminobenzoylamino)-8-hydroxynaphthalene-3,6-disulphonic acid. | Co-Cr mixture. | Black. |

If, instead of 2 mols of a monoamine corresponding to A and B, one mol of the diamines given below under A+B is used per mol of tetrameric cyanogen chloride, then dyestuffs having similar good properties are also obtained.

| No. | A+B | C | Metal | Shade |
|---|---|---|---|---|
| 30 | 1.2-diaminobenzene-4-sulphonic acid | 2-aminonaphthalene-4,8-disulphonic acid→1-amino-3-methylbenzene | | Yellow. |
| 31 | ___do___ | 4-nitro-1-aminobenzene-2-sulphonic acid→2-aminonaphthalene-5,7-disulphonic acid, reduced. | | Orange. |
| 32 | ___do___ | 1-aminobenzene-2-sulphonic acid→1-amino-8-hydroxynaphthalene-3,6-disulphonic acid. | | Red. |
| 33 | 1.2-diaminobenzene | 1-aminobenzene-2,5-disulphonic acid→1-amino-8-hydroxynaphthalene-3,6-disulphonic acid. | | Do. |

Example 2

131 parts of the aminoazo dyestuff (A, B) from diazotised 1-aminobenzene-2-sulphonic acid and 1-(3'-amino-4'-chlorobenzoylamino)-8-hydroxynaphthalene-3,6-disulphonic acid are dissolved with a neutral reaction in 800 parts of water and 100 parts of acetone. At 0° while stirring well, 25.8 parts of tetrameric cyanogen chloride are added dropwise, the pH of the reaction solution being kept at 6–7 by the simultaneous addition dropwise of caustic soda lye. On completion of the reaction, 20 parts of a concentrated ammonia solution (C) are added and the temperature is raised to 30–40°. When the pH of the solution remains stable, the new dyestuff is precipitated by the addition of potassium chloride, filtered off and dried in vacuo at 40–50°. It is a red powder which dissolves in water with a red colour. The dyestuff corresponds to the formula

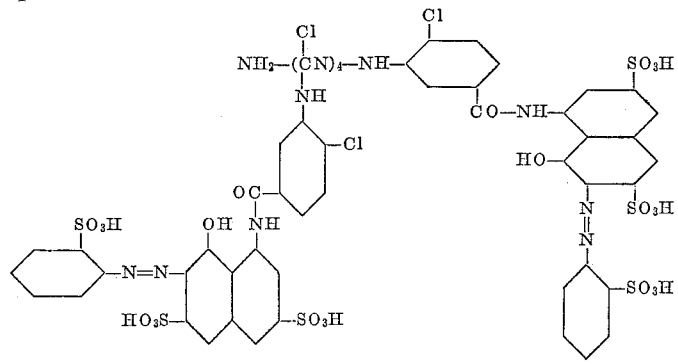

Cotton is treated in the foulard at 50° with a 1% solution of this dyestuff which also contains 20 parts of sodium carbonate and 200 parts of urea per litre. The impregnated goods are dried, then heated for 4 minutes at 140–160° and finally soaped at the boil for 30 minutes. A level red dyeing is obtained which is fast to boiling.

If, instead of the aminoazo dyestuff 1-aminobenzene-2-sulphonic acid→1-(3'-amino-4'-chlorobenzoylamino)-8-hydroxynaphthalene-3,6-disulphonic acid and ammonia, the components given under A, B and C in the following table are used and otherwise the procedure described in the example is followed, then dyestuffs are obtained which produce cellulose dyeings having similarly good fastness properties.

Example 3

34.6 parts of 1-aminobenzene-2-sulphonic acid (A and B) are dissolved with a neutral reaction in 400 parts of water. 25.8 parts of tetrameric cyanogen chloride are added dropwise slowly to this solution at 0° while stirring well, the pH of the reaction solution being kept at 6–6.5 by the simultaneous addition dropwise of a sodium carbonate solution. On completion of the reaction, a neutral solution of 18.8 parts of 1.3-diaminobenzene-4-sulphonic acid (C) in 200 parts of water and an aqueous sodium carbonate solution are both added dropwise simultaneously to the reaction solution at 30–40° so that the pH remains constant. The intermediate product is diazotised by adding to the solution first 6.9 parts of sodium nitrite and then 25 parts of 30% hydrochloric acid at 0–5°. A solution of 23.9 parts of 2-amino-8-hydroxynaphthalene-6-sulphonic acid in 200 parts of water is added to the diazonium compound and the pH is adjusted to 4–4.5 by the dropwise addition of sodium acetate solution. When the coupling is complete, the new dyestuff of the formula

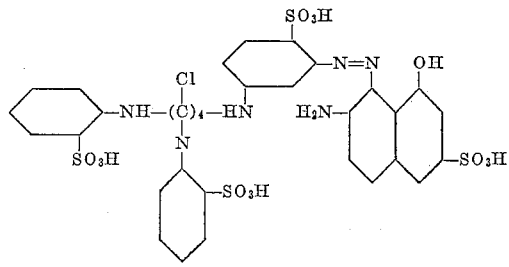

is precipitated with sodium chloride, filtered off and dried

| No. | A=B | Metal | C | Shade |
|---|---|---|---|---|
| 1 | 2-aminonaphthalene-4,8-disulphonic acid→1-amino-3-methylbenzene | | Cl | Yellow. |
| 2 | 1-aminobenzene-2,5-disulphonic acid→1-(4'-aminophenyl)-3-methyl-5-pyrazolone. | | Cl | Do. |
| 3 | 1-aminobenzene-2-sulphonic acid→1-(3'-amino-4'-sulphophenyl)-3-methyl-5-pyrazolone. | | Cl | Do. |
| 4 | 1-aminobenzene-2-sulphonic acid→1-(4'-chloro-3'-aminobenzoylamino)-8-hydroxynaphthalene-3,6-disulphonic acid. | | Cl | Red. |
| 5 | 4-nitro-1-aminobenzene-2-sulphonic acid→2-aminonaphthalene-7-sulphonic acid, reduced. | | 1-aminobenzene-4-sulphonic acid. | Orange. |
| 6 | ___do___ | | Cl | Do. |
| 7 | 2-amino-1-hydroxybenzene-4-sulphonic acid→2-amino-5-hydroxynaphthalene-7-sulphonic acid. | Cu | Cl | Ruby. |
| 8 | ___do___ | Cu | Ethylamine | Do. |
| 9 | 1-diazo-2-hydroxynaphthalene-4-sulphonic acid→2-hydroxynaphthalene + 4-nitro-2-amino-1-hydroxybenzene → 2-amino-5-hydroxynaphthalene-7-sulphonic acid. | Cr | Cl | Grey. |
| 10 | ___do___ | Cr | 1-aminobenzene | Do. | in vacuo at 20–25°. It is a dark powder which dissolves in water with a red colour.

Cotton is treated at 50° in the foulard with a 1% solution of this dyestuff which also contains 20 parts of sodium carbonate and 200 parts of urea per litre. The impregnated goods are dried, then heated for 4 minutes at 140–160° and finally soaped at the boil for 30 minutes. A level red dyeing is obtained which is fast to boiling.

The dyestuff described above corresponds to the schematic formula

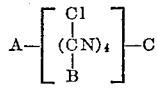

wherein A, B and C represent the radicals of amino compounds named in the above example which are reacted gradually.

If, in the above example, instead of 1-aminobenzene-2-sulphonic acid and instead of 1,3-diaminobenzene-4-sulphonic acid, corresponding amounts of the compounds given in the following table under A, B and C are used, the intermediate product is diazotized and coupled with a coupling component given under D in the table, then dyestuffs having similarly good properties are obtained. In the following tables, under column "D," the "×" means "times," i.e., "multiplied by." For example, No. 11 in the following table indicates under column "D" that two groups of 2-amino-naphthalene-3,6-disulfonic acid are diazotized with the A and B components.

As soon as the reaction is complete, a neutral solution of 31.9 parts of 1-amino-8-hydroxynaphthalene-3,6-disulphonic acid (C) in 200 parts of water is added. The temperature is raised to 35–45° and the pH kept at 6–6.5 by the addition dropwise of sodium carbonate solution. On completion of the reaction the condensation product is precipitated with sodium chloride, filtered off and dissolved in 500 parts of water at 0–5°. 15 parts of sodium bicarbonate are added to this solution and then 17.3 parts of diazotized 1-aminobenzene-2-sulphonic acid which is neutral to Congo red paper are poured in within 30 minutes. As soon as the coupling is complete, sodium chloride is added to the reaction mixture so that the new dyestuff of the formula

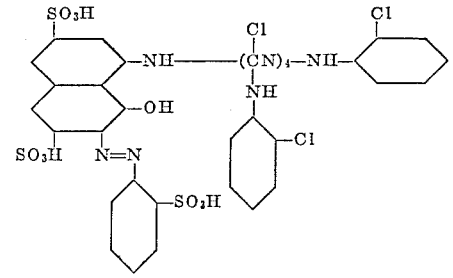

precipitates. It is filtered off and dried in vacuo at 40–50°. It is a red powder which easily dissolves in water with a pure red colour.

| No. | A=B | C | D | Shade |
|---|---|---|---|---|
| 1 | 1-aminobenzene | 1,3-diaminobenzene-4-sulphonic acid | 1-benzoylamino-8-hydroxynapthaline-3, 6- disulphonic acid. | Red. |
| 2 | 1-amino-2-chlorobenzene | do | 1-carbethoxyamino-8-hydroxynaphthalene-3, 6-disulphonic acid. | Do. |
| 3 | 1-aminobenzene-2-sulphonic acid | do | 1-(2'-chloro-5'-sulphophenyl)-3-methyl-5-pyrazolone. | Yellow. |
| 4 | do | 1,3-diaminobenzene-4-sulphonic acid | 3-methyl pyrazolone | Do. |
| 5 | do | do | 1-(phenyl)-3-methyl-5-pyrazolone | Do. |
| 6 | 4-methyl-1-aminobenzene-2-sulphonic acid | do | 1-napththyl-(2')-3-methyl-5-pyrazolone-5', 7'-disulphonic acid. | Do. |
| 7 | 1-aminobenzene | do | 1-(2', 5'-disulphophenyl)-3-methyl-5-pyrazolone | Do. |
| 8 | 1-aminobenzene-3-sulphonic acid | do | 1-naphthyl-(2')-3-methyl-5-pyrazolone-4', 8'-disulphonic acid. | Do. |
| 9 | do | do | 2-aminonaphthalene-5, 7-disulphonic acid | Orange. |
| 10 | 1-aminobenzene-2-sulphonic acid | do | 2-aminonaphthalene-6-sulphonic acid | Do. |
| 11 | 1, 3-diamonobenzene-4-sulphonic acid | Cl | 2×2-aminonaphthalene-3, 6-disulphonic acid | Do. |
| 12 | do | Cl | 2×1-hydroxynaphthalene-3, 6-disulphonic acid | Red-orange. |
| 13 | 1-aminobenzene-2-sulphonic acid | 1, 3-diamonobenzene-4-sulphonic acid | 2-N-methylamino-8-hydroxynaphthalene-6-sulphonic acid. | Red. |
| 14 | ethylamine | do | 2-hydroxynaphthalene, 6, 8-disulphonic acid | Orange. |
| 15 | 1-aminobenzene-2-sulphonic acid | do | 1-(2' 5'-dichloro-4'-sulphophenyl)-3-methyl-5-pyrazolone. | Yellow. |
| 16 | 1,3-diaminobenzene-4-sulphonic acid | $NH_3$ | 2×2-amino-8-hydroxynaphthalene-6-sulphonic acid (coupled acid). | Red. |
| 17 | 1-aminobenzene | 1, 3-diaminobenzene-4-sulphonic acid | 2-aminonaphthalene-5, 7-disulphonic acid | Orange. |
| 18 | 4-aminobenzene-1-sulphonic acid | 1, 3-diamino-6-methylbenzene-4-sulphonic acid | 1-(2', 5'-dichloro-4'-sulphophenyl)-3-methyl-5-pyrazolone. | Yellow. |
| 19 | 1, 3-diaminobenzene-4-sulphonic acid | 1-aminobenzene | 2×2-N-methylamino-8-hydroxynaphthalene-6-sulphonic acid. | Red. |
| 20 | 1-aminobenzene-2-sulphonic acid | 1, 4-diaminobenzene-3-sulphonic acid | 2-amino-8-hydroxynaphthalene-6-sulphonic acid (coupled acid). | Do. |
| 21 | do | do | 2-aminonaphthalene-5- 7-disulphonic acid | Orange. |
| 22 | do | do | 2-amino-8-hydroxynaphthalene-3, 6-disulphonic acid. | Red-brown. |
| 23 | do | 4, 4'-diaminodiphenyl-3-sulphonic acid | 1-(2', 5'-dichloro-4'-sulphophenyl)-3-methyl-5-pyrazolone. | Yellow. |
| 24 | do | do | 1-hydroxynaphthalene-3-sulphonic acid | Scarlet. |
| 25 | do | 1-(4'-aminobenzoylamino)-3-aminobenzene-4-sulphonic acid | 1-benzoylamino-8-hydroxynaphthalene-3, 6-disulphonic acid. | Red. |
| 26 | do | do | 2-amino-8-hydroxynaphthalene-6-sulphonic acid (coupled acid) | Do. |
| 27 | do | do | 1-(2', 5'-dichloro-4'-sulphophenyl)-3-methyl-5-pyrazolone. | Yellow. |
| 28 | 1, 3-diaminobenzene-4-sulphonic acid | Cl | 2×1-(3'-sulphophenyl)-3-methyl-5-pyrazolone | Do. |
| 29 | 1, 3-diamino-6-methylbenzene-4-sulphonic acid | 1-aminobenzene-3-sulphonic acid | 2×2-aminonaphthalene-6-sulphonic acid | Orange. |
| 30 | 1-amino-2-chlorobenzene | 1, 3-diamino-6-methylbenzene-4-sulphonic acid | 1-acetylamino-8-hydroxynaphthalene-3, 6-disulphonic acid. | Red. |
| 31 | do | do | 2×1-carbethoxyamino-8-hydroxynapthalene-3, 6-disulphonic acid. | Do. |

*Example 4*

25.5 parts of 2-chloro-1-aminobenzene (A and B) are dissolved in 500 parts of water and 500 parts of acetone. At 0° while stirring, 25.8 parts of tetrameric cyanogen chloride and 105 parts by volume of 2 N-caustic soda lye are added dropwise simultaneously in such a manner that the pH of the mixture remains between 5 and 6.

If cotton is treated at 20° in the foulard with a 2% aqueous solution of this dyestuff, dried, then treated with a 1% sodium hydroxide solution which also contains 30% sodium chloride, then steamed for 5 minutes at 100–103° and finally rinsed and soaped at the boil for 30 minutes, then a pure red dyeing is obtained which has excellent fastness to washing.

The dyestuff described above corresponds to the schematic formula

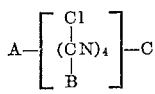

wherein A, B and C represent the radicals of amino compounds mentioned in the above example which are reacted gradually.

If in the above example, instead of 1-amino-8-hydroxynaphthalene-3,6-disulphonic acid and 1-aminodichlorobenzene, equivalent parts of the compounds given under A, B and C in the following table are used and the intermediate product is coupled with the diazonium compound given under D in the table, then dyestuffs having similar properties are obtained.

groups can be traced, the dyestuff is salted out, filtered off and dried in vacuo at 20–30°. It is a dark blue powder which dissolves in water with a clear green-blue colour.

If cotton is impregnated in the foulard at 50° with a 1% solution of this dyestuff with the addition of 20 parts of sodium carbonate per litre, rolled up and exposed to heat for 2 hours at 95°, rinsed and then soaped at the boil for 30 minutes, then turquoise blue dyeings are obtained which are fast to boiling.

If the copper phthalocyanine sulphochloride obtained by the method described above is reacted with a diamine described in column X of the following table and then combined with equimolar amounts of a condensation product from tetrameric cyanogen chloride and the amino

| No. | A=B | C | D | Shade |
|---|---|---|---|---|
| 1 | 1-aminobenzene | 1-(3'-aminobenzoylamino)-8-hydroxynaphthalene-3,6-disulphonic acid. | 1-aminobenzene-2-sulphonic acid | Red. |
| 2 | 1-aminobenzene-2-sulphonic acid | 2-amino-8-hydroxynaphthalene-6-sulphonic acid. | do | Orange. |
| 3 | ethylamine | 1-amino-8-hydroxynaphthalene-3,6-disulphonic acid. | 1-amino-3-acetylaminobenzene-6-sulphonic acid. | Red. |
| 4 | 1-aminobenzene-2-sulphonic acid | 1-amino-8-hydroxynaphthalene-4,6-disulphonic acid. | 1-amino-3-benzoylaminobenzene-6-sulphonic acid. | Bluish red. |
| 5 | do | 2-amino-5-hydroxynaphthalene-7-sulphonic acid. | 1-amino-4-acetylaminobenzene-6-sulphonic acid. | Scarlet. |
| 6 | NH$_3$ | 1-(3'-aminobenzoylamino)-8-hydroxynaphthalene-3,6-disulphonic acid. | 1-aminobenzene-2,5-disulphonic acid | Red. |
| 7 | 1-aminobenzene-2-sulphonic acid | 2-(3'-aminobenzoylamino)-5-hydroxynaphthalene-7-sulphonic acid. | 4-methyl-1-aminobenzene-6-sulphonic acid. | Orange. |
| 8 | do | 1-amino-5-hydroxynaphthalene-7-sulphonic acid. | 1-aminobenzene-2-sulphonic acid | Do. |
| 9 | 1-amino-8-hydroxynaphthalene-4,6-disulphonic acid. | NH$_3$ | 2×1-aminobenzene-2-sulphonic acid | Red. |
| 10 | 1-(3'-aminophenyl)-3-methyl-5-pyrazolone. | 1-aminobenzene-2,5-disulphonic acid | 2×1-amino-4-chlorobenzene-2-sulphonic acid. | Yellow. |
| 11 | 2-(3'-amino-4'-chlorobenzoylamino)-5-hydroxynaphthalene-7-sulphonic acid. | Cl | 2×4-acetylamino-2-aminobenzene-1-sulphonic acid. | Yellow-red. |
| 12 | 1-(3'-aminobenzoylamino)-8-hydroxynaphthalene-3,6-disulphonic acid. | Cl | 2×1-aminobenzene-2-sulphonic acid | Red. |

*Example 5*

10 parts of copper phthalocyanine are heated for 4 hours at 140–142° in 70 parts of chlorosulphonic acid.

compounds mentioned in columns A and B, then similar products which dye cellulose fibres turquoise blue to green are obtained which have excellent fastness to wet and light.

| No. | X | A=B | Shade |
|---|---|---|---|
| 1 | 1,3-diaminobenzene-4-sulphonic acid | 1-aminobenzene-2-sulphonic acid | Turquoise blue. |
| 2 | do | 1,2-diaminobenzene-4-sulphonic acid | Do. |
| 3 | 1,4-diaminobenzene-3-sulphonic acid | 1-aminobenzene-2-sulphonic acid | Do. |
| 4 | do | 1-aminobenzene-2-sulphonic acid→1-(3'-aminophenyl)-3-methyl-5-pyrazolone-4-sulphonic acid | Green. |
| 5 | 4,4-diaminodiphenyl-3-sulphonic acid | 1-amino-2-chlorobenzene | Turquoise blue. |
| 6 | do | 4'-amino-2-nitrophenylamine-4-sulphonic acid | Green. |
| 7 | ethylenediamine | 1-aminobenzene-2-sulphonic acid | Turquoise blue. |
| 8 | N-hydroxyethyl-ethylene-diamine | 2-naphthylene-6-sulphonic acid | Do. |

After cooling, the solution is poured into a mixture of ice and sodium chloride. The suspension obtained is filtered and the residue is washed with a 10% sodium chloride solution until the filtrate no longer colours Congo red paper blue. The filter cake is pasted in 100 parts of water and 100 parts of ice and the pH of the mixture is adjusted to 7 with dilute caustic soda lye. A solution of 13.8 parts of 4,4'-diaminodiphenyl-2,2'-disulphonic acid in 100 parts of water and 20 parts by volume of 2 N-caustic soda lye is then poured in. The pH is kept constant at 8.4–8.5 by the addition of 50 parts by volume of 2 N-sodium carbonate solution. After stirring for 20 hours at room temperature, the dyestuff is precipitated by the addition of sodium chloride and hydrochloric acid and is filtered off. The filter cake is dissolved in 400 parts of water, the pH being kept at 5–5.5 with caustic soda lye. An aqueous solution of 22.9 parts of the intermediate product produced according to Example 3 by condensing 1-aminobenzene-2-sulphonic acid with tetrameric cyanogen chloride, is added dropwise to this solution within 30 minutes at 30–40°. The pH of the mixture is kept at 5–5.5 by the simultaneous addition dropwise of 2 N-sodium carbonate solution. As soon as no more amino

*Example 6*

40.9 parts of 1-amino-4-(4'-aminophenylamino)-anthraquinone-2-sulphonic acid are added to 500 parts of 30% oleum at 20–25°. The whole is stirred for 24–36 hours at 20–25°, the reaction mixture is then poured onto ice and the precipitated dyestuff of the formula

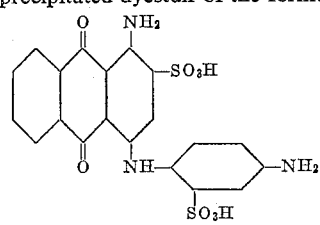

is filtered off and dried.

2.5 parts of tetrameric cyanogen chloride are dissolved in 10 parts of acetone and the solution is added to an aqueous solution of 9.8 parts of the above dyestuff in 250 parts of water which has been adjusted to pH 6–6.5 with sodium carbonate. The addition is made fairly quickly dropwise, and the pH of the reaction mixture is kept at 6–6.5 by the simultaneous addition dropwise of sodium carbonate solution. On completion of the condensation, the anthraquinone dyestuff of the formula

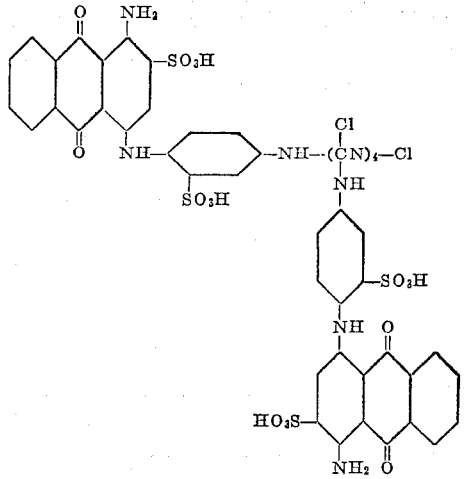

is precipitated with sodium chloride, filtered off, washed with sodium chloride solution and dried in vacuo at 20–25°. It is a dark powder which dissolves easily in water with a blue colour.

2 parts of this dyestuff are dissolved in 400 parts of water. 100 parts of cotton are entered at 20–25° and the bath is heated within 30 minutes to 40–45°. Sodium chloride is simultaneously added so that the content is finally 50 g. per litre. Then 10 parts of trisodium phosphate are added to the bath and the cotton is dyed for 60 minutes at this temperature. Finally the goods are rinsed and soaped at the boil for 30 minutes, the soap solution being only slightly coloured. A level blue dyeing is obtained which is fast to light, washing and boiling.

If instead of 1-amino-4-(4'-aminophenylamino)-anthraquinone-2-sulphonic acid, the anthraquinone compounds given in the following table are used and they and the amines also given in the table are condensed as described in the above example in the order A, B and C with tetrameric cyanogen chloride, then dyestuffs are obtained which produce cellulose dyeings having similarly good fastness properties.

| No. | A = B | C | Shade |
|---|---|---|---|
| 1 | 1-aminobenzene-2-sulphonic acid | [anthraquinone with NH2, SO3H, NH-biphenyl-NH2, SO3H] | Blue. |
| 2 | [anthraquinone with NH2, SO3H, NH-phenyl(SO3H)-NH2] | Cl | Green. |
| 3 | [anthraquinone with NH2, O-phenyl, NH-phenyl(SO3H)-NH2] | 1-aminobenzene-2-sulphonic acid | Violet. |
| 4 | 1-aminobenzene-2-sulphonic acid | Cl-[anthraquinone with NH2, SO3H, NH-phenyl(CH3)2-NH2] | Blue. |
| 5 | [anthraquinone with NH2, SO3H, NH-phenyl(SO3H)-NH2] | NH | Green. |

| No. | A=B | C | Shade |
|---|---|---|---|
| 6 | 1-aminobenzene-2-sulphonic acid | 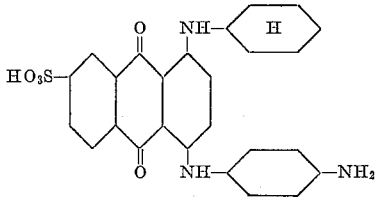 | Do. |
| 7 | 1-aminobenzene-2-sulphonic acid | 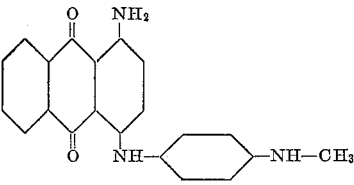 | Blue. |
| 8 | 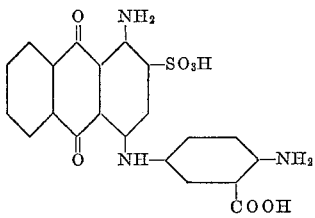 | Cl | Do. |
| 9 | 1-aminobenzene-2-sulphonic acid | 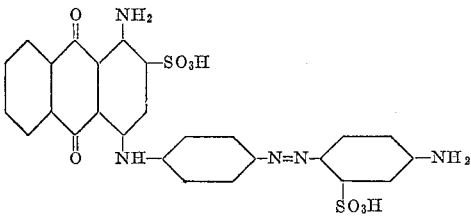 | Olive green. |
| 10 | 1-aminobenzene-3-sulphonic acid | 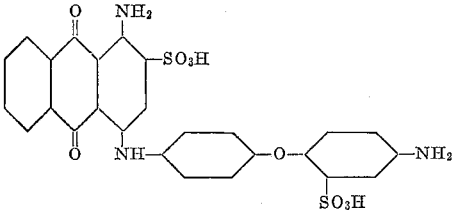 | Blue. |
| 11 | 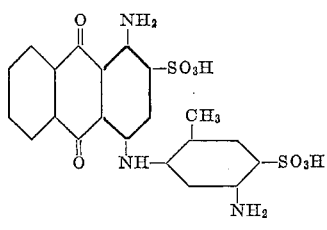 | Cl | Do. |

*Example 7*

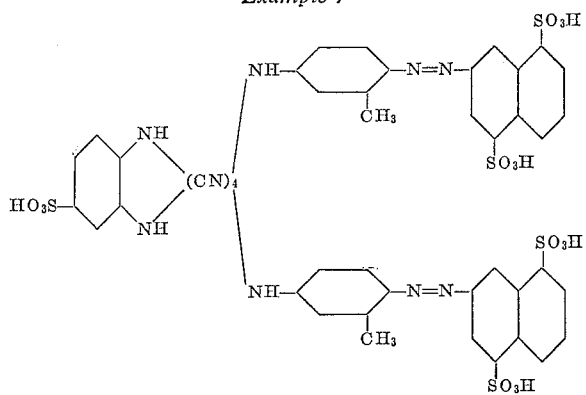

18.8 parts of 1,2-diaminobenzene-4-sulphonic acid are dissolved in 300 parts of water with a neutral reaction. At 0°–5°, 25.8 parts of tetrameric cyanogen chloride are added dropwise and the pH of the reaction mixture is kept at 5–6 by the simultaneous addition of caustic soda lye. On completion of the condensation, a neutralized solution of 74 parts of the aminoazo dyestuff from diazotized 2-aminonaphthalene-4,8-disulphonic acid and 1-amino-3-methylbenzene in 300 parts of water is added and the whole is boiled under reflux, the pH of the reaction solution being kept at 6–7 by the dropwise addition of sodium carbonate solution. As soon as no more starting dyestuff can be traced, the new dyestuff is precipitated by the addition of sodium chloride, filtered off and dried in vacuo at 70–80°. It is a yellow-brown powder which dissolves in water with a yellow colour.

2 parts of this dyestuff are dissolved in a dyebath containing 3000 parts of water. 100 parts of cotton are introduced at 40–50°, the bath is heated to 90–95° within 30 minutes, 45 parts of sodium sulphate are added and dyeing is performed for 45 minutes at this temperature. The dyed goods are rinsed cold and dried. A yellow dyeing of good fastness to light is obtained.

If in this example, instead of the dyestuff 2-aminonaphthalene-4,8-disulphonic acid→1-amino-3-methylbenzene, equivalent parts of the dyestuff 1-amino-8-toluene sulphonyloxynaphthalene-3,6-disulphonic acid→1-amino-2-methoxy-5-methylbenzene are used, saponified with caustic soda lye, then a dyestuff is obtained which dyes cotton in red shades and the dyeings have similar fastness properties.

*Example 8*

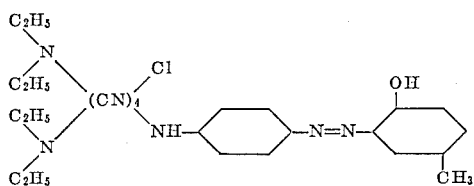

24.6 parts of tetrameric cyanogen chloride are dissolved in 500 parts of ether and 29.2 parts of diethylamine in 250 parts of ether are added dropwise at −15°. After stirring for 3 hours at 0°, precipitated diethylamine hydrochloride is filtered off and the ether is distilled off. The residue is taken up in 300 parts of acetone and is condensed, in the presence of anhydrous sodium acetate, with 22.7 parts of 4-amino-2′-hydroxy-5′-methyl-1,1′-azobenzene at 50°. The yellow-brown product obtained is filtered off under suction, washed with water and dried at 50–60°.

1 part of this dyestuff is milled with 2 parts of an alkyl benzene sulphonate. An aqueous suspension thereof dyes cellulose ester fibres in yellow shades which have good fastness to light.

If in the above example, instead of diethylamine, 40.4 parts of di-isopropylamine or 51.1 parts of di-isobutylamine or 62.8 parts of di-n-amylamine are used, then dyestuffs are obtained which produce dyeings having similar properties on cellulose ester fibres.

*Example 9*

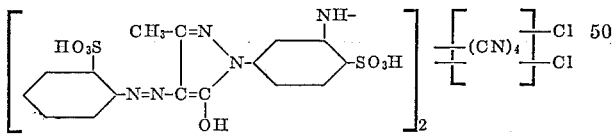

90.6 parts of the aminoazo dyestuff from diazotized 1-aminobenzene-2-sulphonic acid and 1-(3′-amino-4′-sulphonylphenyl)-3-methyl-5-pyrazolone are dissolved with a neutral reaction in 800 parts of water and 100 parts of acetone. At 0° while stirring well, 25.8 parts of tetrameric cyanogen chloride are added dropwise the pH of the reaction solution being kept at 6–7 by the simultaneous addition dropwise of caustic soda lye. On completion of the condensation, the dyestuff is precipitated by the addition of sodium chloride, filtered off and dried in vacuo at 20–30°. It is a yellow powder which dissolves in water with a yellow colour.

The dyestuff dyes cellulose fibres in yellow shades which are fast to light and washing by, for example, the following process:

Cotton is treated in the foulard at 50° with a 2% solution of this dyestuff which contains 20 parts of sodium carbonate and 200 parts of urea per litre. The impregnated goods are dried, then heated for 4 minutes at 140–160° and finally soaped at the boil for 30 minutes.

*Example 10*

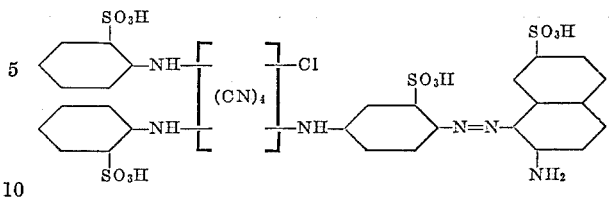

34.6 parts of 1-aminobenzene-2-sulphonic acid are condensed as described in Example 3 with 25.8 parts of tetrameric cyanogen chloride. A neutral solution of the sodium salt of 42 parts of the aminoazo dyestuff obtained by coupling diazotized 4-nitro-1-aminobenzene-2-sulphonic acid in the presence of sodium acetate with 2-aminonaphthalene-7-sulphonic acid and reducing the nitroazo dyestuff obtained with sodium sulphide at 30–40°, in 400 parts of water is added to the reaction solution. The whole is heated to 40–50° and the pH of the solution is kept at 7 to 8 by the addition of sodium carbonate. On completion of the condensation, the dyestuff is precipitated by the addition of sodium chloride, filtered off and dried in vacuo at 50–60°.

The new dyestuff is an orange-red powder which dissolves in water with an orange-red colour.

If cotton is dyed therewith as described in Example 3, then an orange-red dyeing is obtained which is fast to boiling.

What we claim is:

1. Dyestuff of the general formula

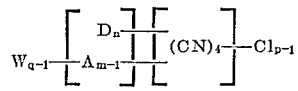

wherein

D is the radical of an amino dyestuff bound to a carbon atom of tetrameric cyanogen by amino-nitrogen, said amino dyestuff being a member selected from the group consisting of naphthalene-azo-aminobenzene, disulfopyrene-azo-aminobenzene, benzene-azo-aminonaphthalene, naphthalene - azo - benzene-azo-aminobenzene, benzene-azo - benzene - azo-aminobenzene, benzthiazole-azo-aminobenzene, benzene - azo - 1-aminophenyl-3-methyl - 5 - pyrazolone, 1 - aminonaphthalene - azo - benzene - azo - benzene, 1-aminonaphthalene-azo-benzene - azo - naphthalene, 1-aminonaphthalene-azo-benzene - azo - 3 - methyl-5-pyrazolone and naphthalene-azo-aminonaphthalene, A is the radical of a nitrogeneous base bound to a carbon atom of tetrameric cyanogen by amino-nitrogen, said nitrogenous base being a member selected from the group consisting of ammonia, lower primary and secondary aliphatic amines and primary and secondary phenylamines, W is a water-solubilizing anionic salt-forming group selected from the group consisting of —SO$_3$H and —COOH, $m-1$ is the number of amino-nitrogen bound to carbon atoms of tetrameric cyanogen, $n$ is a positive whole number of at most 2, $m$ and $p$ are a positive whole number of at most 3, $q$ is a positive whole number of at most 7, the sum of $n$, $(m-1)$ and $(p-1)$ being 4, and (CN)$_4$ is tetrameric cyanogen.

2. A dyestuff of the formula

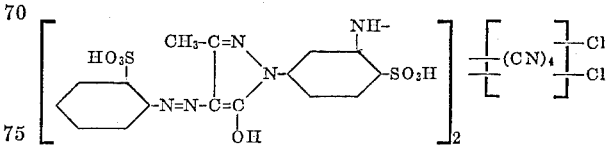

3. A dyestuff of the formula
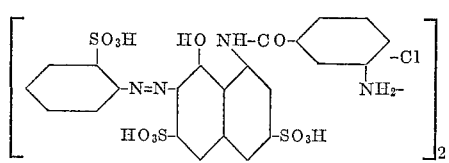
wherein $(CN)_4$ is tetrameric cyanogen.
4. A dyestuff of the formula
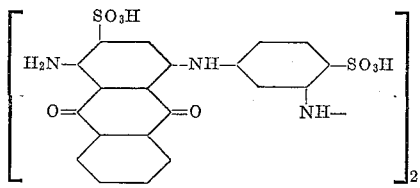
wherein $(CN)_4$ is tetrameric cyanogen.
5. A dyestuff of the formula
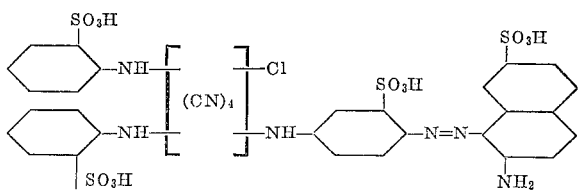
wherein $(CN)_4$ is tetrameric cyanogen.
6. A dyestuff of the formula
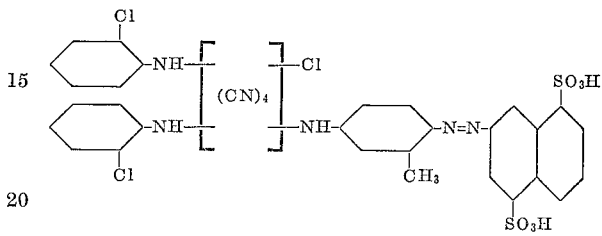
wherein $(CN)_4$ is tetrameric cyanogen.
No references cited.